United States Patent
Repossini et al.

(10) Patent No.: US 11,559,863 B2
(45) Date of Patent: Jan. 24, 2023

(54) C-AXIS UNIT FOR A MACHINE TOOL WITH HIGH-SPEED CUTTING

(71) Applicant: FIDIA S.p.A., San Mauro Torinese (IT)

(72) Inventors: Claudio Ugo Protaso Repossini, Milan (IT); Giuseppe Morfino, Pino Torinese (IT)

(73) Assignee: FIDIA S.P.A., San Mauro Torinese (IT)

( * ) Notice: Subject to any disclaimer, the term of this patent is extended or adjusted under 35 U.S.C. 154(b) by 86 days.

(21) Appl. No.: 16/567,688

(22) Filed: Sep. 11, 2019

(65) Prior Publication Data
US 2020/0078889 A1    Mar. 12, 2020

(30) Foreign Application Priority Data

Sep. 12, 2018 (IT) .......................... 102018000008535

(51) Int. Cl.
*B23Q 5/10*   (2006.01)
*B23Q 5/04*   (2006.01)
*B23Q 1/48*   (2006.01)

(52) U.S. Cl.
CPC ............. *B23Q 1/4828* (2013.01); *B23Q 5/04* (2013.01); *B23Q 5/10* (2013.01)

(58) Field of Classification Search
CPC .......... B23C 9/005; B23C 1/12; B23C 1/002; B23C 1/06; B23C 2270/022;
(Continued)

(56) References Cited

U.S. PATENT DOCUMENTS 3,460,435 A * 8/1969 Dahl ................... B23Q 1/5412
409/230
3,757,637 A * 9/1973 Eich ..................... B23Q 16/028
409/230
(Continued)

FOREIGN PATENT DOCUMENTS

CN         101767285        7/2010
DE          20311730       10/2003
(Continued)

OTHER PUBLICATIONS

Description DE102005046847A1 (translation) obtained at https://worldwide.espacenet.com/ (last visited Jun. 4, 2022).*
(Continued)

*Primary Examiner* — Ryan Rufo
(74) *Attorney, Agent, or Firm* — McAndrews, Held & Malloy, Ltd.

(57) ABSTRACT

A C-axis unit for a machine tool, the C-axis unit comprising a bushing (134) adapted to be fixed to a unit support (121) of the machine tool; a head mounting platform (130) adapted to receive an operating head (40), the head mounting platform being supported by the bushing (134) and being rotatable relative to the bushing (134) around a vertical axis; a platform rotation motor (150) supported by the bushing (134) and configured to control the rotation of the head mounting platform (130); and a spindle motor (160) configured to control the rotation of a tool-carrying spindle (45) on the operating head (40) through a driving extension (163) arranged in a through-bore (133) obtained through the head mounting platform (130). The spindle motor (160) is fixed to and is rotationally integral with the head mounting platform (130).

5 Claims, 11 Drawing Sheets

(58) Field of Classification Search
CPC ........ B23Q 2705/104; B23Q 2705/145; B23Q 5/10; B23Q 5/04; B23Q 5/28; B23Q 2220/006; Y10T 409/307672
See application file for complete search history.

(56) References Cited

U.S. PATENT DOCUMENTS

| | | | | |
|---|---|---|---|---|
| 5,385,436 | A * | 1/1995 | Corsi | B23Q 1/40 409/201 |
| 6,746,188 | B2 * | 6/2004 | Watanabe | B23Q 5/048 409/201 |
| 8,579,560 | B2 * | 11/2013 | Tatsuda | B23Q 1/70 409/216 |
| 2001/0046423 | A1 * | 11/2001 | Colombo | B23Q 5/045 409/230 |
| 2012/0263551 | A1 * | 10/2012 | Ura | F16L 39/04 409/135 |
| 2021/0252654 | A1 * | 8/2021 | Parpajola | B23Q 11/001 |

FOREIGN PATENT DOCUMENTS

| | | | | |
|---|---|---|---|---|
| DE | 102005046847 A1 * | 4/2007 | | B23B 3/065 |
| DE | 102010054636 A1 * | 6/2012 | | B23C 1/12 |
| EP | 1172175 | 1/2002 | | |
| EP | 1172175 A2 * | 1/2002 | | B23Q 1/0018 |
| EP | 2420347 A1 * | 2/2012 | | B23Q 1/5412 |
| WO | WO-2016113393 A1 * | 7/2016 | | H02G 11/006 |

OTHER PUBLICATIONS

Italian Search Report for IT201800008535, dated May 9, 2019 (6 pages).

* cited by examiner

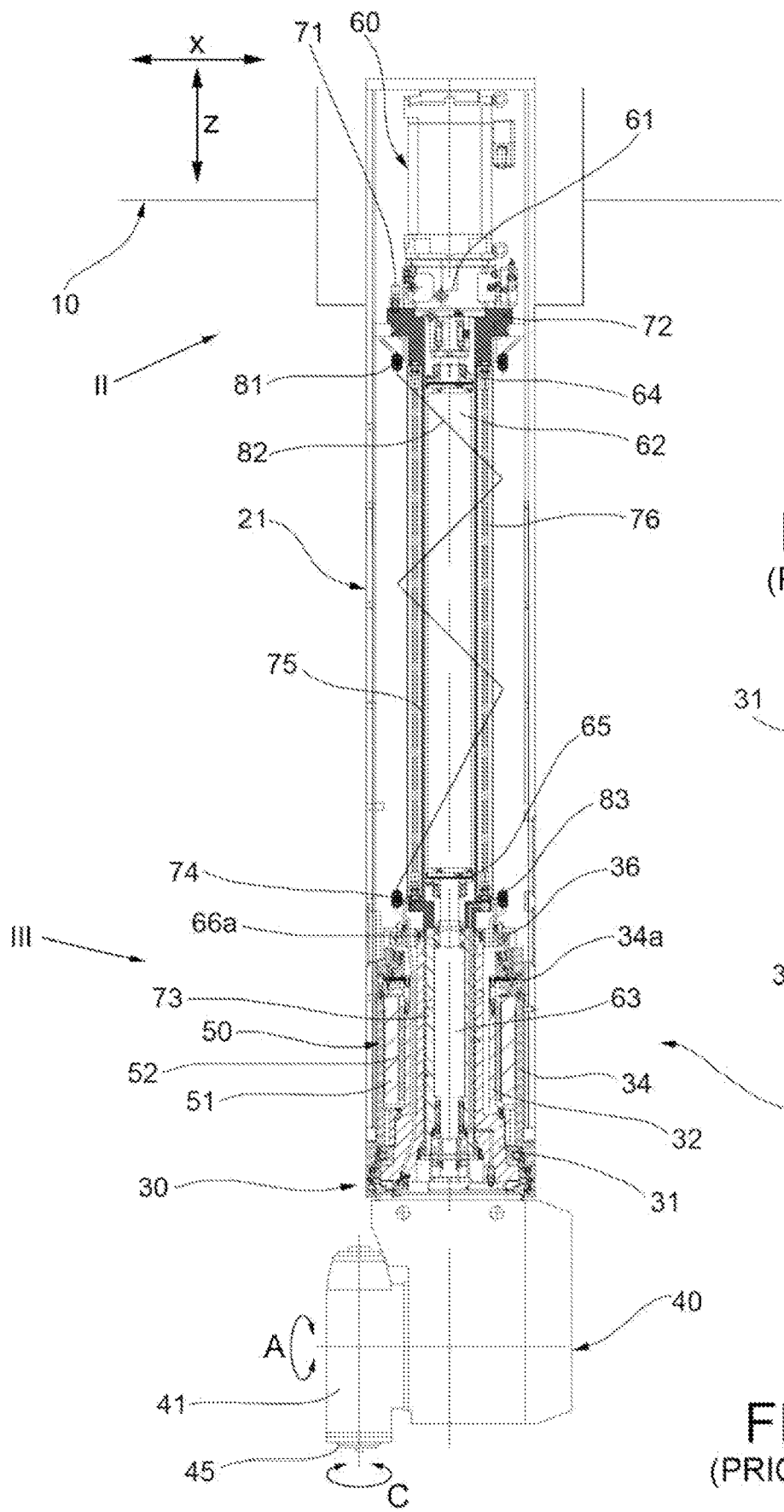
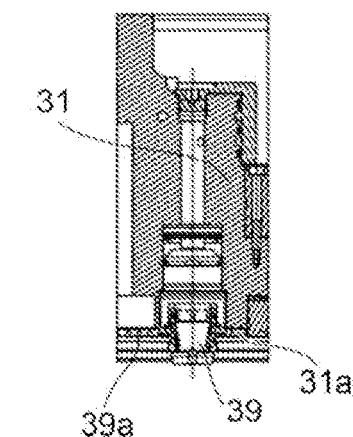
FIG.3a
(PRIOR ART)
FIG.1
(PRIOR ART)

C-AXIS UNIT FOR A MACHINE TOOL WITH HIGH-SPEED CUTTING

This application claims priority under 35 U.S.C. 119 to Italian Patent Application No. 102018000008535, filed on Sep. 12, 2018, the entirety of which is incorporated by reference herein.

FIELD OF THE INVENTION

The present invention relates in general to the machine tool sector for machining by chip removal, and in particular to high-speed cutting machines (HSC).

BACKGROUND

The strong and continuous evolution of HSC technology requires machine tools with high dynamic performance of both the feed axes and the tool-carrying spindles.

In the 5-axis sculptural machining sector, i.e. in the molding, aeronautics, energy sectors, styling center models, etc., the demand for 5-axis machines with high dynamic performance of both linear and polar axes is increasingly strong and stringent.

Other strong demands coming from the mentioned sectors are the reduction of processing costs and the use of multi-tasking machines able to be modular and reconfigurable, i.e. to satisfy the complex and articulated problems of the machining processes.

Considering the demands originating from the machining processes, which have an impact transversely on the specifications of the machines, the critical issues that characterize the current state of the art of 5-axis machines have been defined.

Some of these refer to the need to configure 5-axis machine tools (3 linear and 2 polar) able to perform roughing and finishing operations with operating heads aligned to the current state of the art of HSC technology.

The configurability and modularity of the machining systems is also strongly conditioned by the morphology of the polar axis C, which must be able to allow the automatic coupling of a series of powerful, fast and reliable operating heads.

With reference to FIGS. 1 to 3, a known machine tool is described for this purpose, of which only the part related to the movement according to the polar axis C is represented in FIGS. 1 to 3. In 5-axis machine tools, the three linear axes are conventionally designated with X, Y and Z, whereas the two polar axes of rotation around the horizontal axis X and around the vertical axis Z are designated with A and C respectively. In the figures, the unrepresented axis Y is perpendicular to the drawing plane (the axes X and Y may be reversed).

The machine tool comprises a bearing structure 10, simply sketched in FIG. 1, and a support group 21, supported by the bearing structure 10 and translationally movable in a way known per se with respect to the bearing structure 10 along at least one axis, and in particular along two horizontal orthogonal axes X and Y and along a vertical axis Z.

In the example illustrated, the unit support 21 is made as a ram that extends along the vertical axis Z, and for simplicity will be indicated as such hereinafter. The ram 21 is connected to the machine tool's bearing structure 10 in a way that is known per se.

A C-axis unit 20 is arranged on board the ram 21, at a lower end thereof.

The C-axis unit comprises a head mounting platform 30 adapted to receive an operating head 40. The head mounting platform 30 is rotatable with respect to the ram 21 around the vertical axis Z, and thus in the direction of the polar axis C. The head mounting platform 30 comprises a main body 31, to which the operating head 40 is intended to be fixed, and a shaft 32 extending coaxially with the axis Z. The shaft 32 is made as a single piece with the main body 31 and, as will be clarified hereinafter, constitutes the rotary part of a rotary joint. A central through-bore 33 is obtained through the head mounting platform 30, the purpose of which will be clarified hereinafter. A series of gaskets 33a is arranged along the central bore 33.

The head mounting platform 30 is supported by a bushing 34 fixed to the bottom of the ram 21. In particular, the head mounting platform 30 is supported by the bushing 34 by means of a radial-axial bearing 35 and a roller bearing 36. Between the head mounting platform 30 and the bushing 34 there is further interposed a multi-plate clutch 34a which may be activated when one needs to lock the head mounting platform 30 with respect to the bushing 34/ram 21.

On a lower surface 31a of the main body 31 of the head mounting platform 30 are arranged electrical connectors 37 and hydraulic connectors 38, adapted to supply the electrical power, signal and fluid users on the operating head 40. In the lower part of the main body 31 of the head mounting platform 30 are also arranged head coupling systems 39 that may be manual or automatic (visible in the enlarged detail of FIG. 3a). These head coupling systems 39 also comprise a lock with a Hirth type toothed frontal connector 39a, which may be activated to give greater rigidity and mechanical stability to the connection between the head mounting platform 30 and the operating head 40.

The operating head 40 is fixed (manually, semi-automatically or automatically) to the head mounting platform 30 in such a way as to also be rotatable around the vertical axis Z. In the example shown, the operating head 40 is configured in such a way as to have a part 41 rotatable with respect to the operating head 40 around the horizontal axis X, and thus according to the direction of the polar axis A. On board the part 41 of the operating head 40 a tool-carrying spindle 45 is arranged, which is intended for the attachment of a tool (not shown). The head 40 described above may be removed and replaced with heads with different architectures.

Underneath the operating head 40 there is arranged a workpiece-carrying unit to support a workpiece.

The C-axis unit further comprises a platform rotation motor 50 configured to control the rotation of the head mounting platform 30. The platform rotation motor 50 may, for example, consist of a torque motor, a worm gear/helical wheel motor, or preloaded electrical double motors. The platform rotation motor 50 comprises a radially outer stator part 51 fixed to the bushing 34, and a radially inner rotor part 52 fixed to the shaft 32 of the head mounting platform 30.

A spindle motor 60 is arranged on board the ram 21, at the upper part thereof, together with a gearbox 61 associated with the spindle motor 60. The spindle motor 60 is configured to control the rotation of the tool-carrying spindle 45 on the operating head 40. For this purpose, a transmission shaft 62 and a driving extension 63 are provided to transmit power to the head mounting platform 30. An upper end of the transmission shaft 62 is connected to the output shaft of the gearbox 61 by means of an upper transmission coupling 64, whereas a lower end of the transmission shaft 62 is made rotationally integral with the driving extension 63 by means of a lower transmission coupling 65. The driving extension 63 is connected to the head mounting platform 30 by means of bearings 66.

The driving extension 63 may be connected to a kinematic chain inside the operating head 40 and to the spindle 45 by means of a keyway connection or a grooved shaft 67-68. The coupling is constructed in two parts, so as to ensure the separation of the operating head 40 from the head mounting platform 30. The female part of the coupling 67 is integral with the driving extension 63, whereas the male part of the coupling 68 is mounted on the input shaft of the operating head 40.

The fluid users on the operating head 40 are supplied through tubing 71 that connects a dedicated hydraulic control unit of the machine tool (not shown) to a hydraulic distributor 72 fixed to a septum (horizontal rib) of the ram 21. The body of the hydraulic valve 72 also serves as a support for the motor/gearbox unit 60, 61.

Between the hydraulic distributor 72 and the users on the operating head 40 there is interposed a fluidic rotary joint comprising a stationary part 73 (stationary with respect to the ram 21) and a rotary part. This rotary part consists of the shaft 32 of the head mounting platform 30. The stationary part 73 of the rotary joint is inserted in the central bore 33 of the head mounting platform 30. The anti-rotation constraint of the stationary part 73 of the rotary joint is obtained with a support 74 (connected to the stationary part 73 of the rotary joint) that through a tube 75 is connected to the body of the hydraulic distributor 72 that is fixed to the septum (horizontal rib) of the ram 21. The drive shaft 62 is housed inside the tube 75.

The stationary part 73 of the rotary joint is fluidically supplied through tubing 76 connecting the hydraulic distributor 72 to the support 74 and then to the stationary part 73 of the rotary joint.

Through fluid supply bores 73a made in the stationary part 73 of the rotary joint and the gaskets 33a, fluid is supplied to the head mounting platform 30 and the hydraulic connectors 38.

The power and signal users on the operating head 40 are supplied by electric power and signal cables that connect the electrical and numerical control cabinets of the machine tool (not shown) to electrical power and signal connectors 81 fixed in stationary part to the body of the distributor 72.

The power supply to the head mounting platform 30 and therefore to the electric connectors 37 is provided by means of cables 82 that are wound according to a spiral trajectory that joins the electric connectors 81 of the distributor 72 to the electric connectors 83 arranged integral with the shaft 32 of the head mounting platform 30. These electric connectors 83 are in turn electrically connected to the electric connectors 37 arranged on the surface 31a of the head mounting platform 30.

To avoid damaging collisions and breakages between the electric cables 82 that move along a spiral trajectory and the tubing 76 that is fixed and does not rotate, a tube 84 is adopted with a smooth and greased outer surface, which rotates with the head mounting platform 30 and allows the separation between the electric cables and the hydraulic tubing.

The machine described above has several critical issues.

First of all, the spindle motor 60 mounted on the ram 21, at the upper end thereof, makes it difficult to arrange the electric power and signal cables of the operating heads, the architecture of the hydraulic rotary joint and the layout of the hydraulic tubing.

Moreover, in operation, the electric power and signal cables 82 are twisted and bent in a spiral pattern, on one hand limiting the angular travel of the head to +/−180° and on the other, leading to significant cable wear, which requires frequent maintenance. The complex management of the electric cables 82 further limits the dynamic performance of the C-axis, compromising the HSC machining Typically, machining speeds of 5 rpm and angular accelerations of 0.1 rad/sec$^2$ may be achieved.

Moreover, the morphology of the system does not allow the adoption of slip rings that allow endless machining (continuous rotation of the polar axes), a specific feature strongly demanded, for example, in the aeronautical sector.

The location in the upper part of the gearbox/spindle motor unit 61, 60 is mandatory and depends on the length of the transmission shaft 62, which must be high to allow an adequate length of the cables 82 so as to reduce the bending and twisting of the same cables and thus ensure an acceptable life span thereof. A long transmission shaft 62 has a heavy negative effect on its torsional rigidity, such as to limit heavy roughing operations that require significant torques. Also, the high-speed finishing of the mechanical spindles 45 is severely restricted due to the length of the transmission shaft 62, which limits the critical rotation speed.

The lower hydraulic rotary joint formed of parts 73 and 32 is integrated into the head mounting platform 30. The numerous gaskets 33a necessary to supply the users of the operating heads generate high friction torques, which produce torque disturbances to the rotating platform motor 50.

The critical issues described above severely limit the dynamic performance of the C-axis and of the motor drive of the spindle of the operating head. Moreover, the assembly of the various units is complex, and the construction of the components is not in line with the most modern guidelines of modular and reconfigurable systems.

SUMMARY OF THE INVENTION

An object of the present invention is to provide a machine tool which allows the drawbacks described above of the machine according to the prior art to be at least partially overcome.

This and other objects are achieved according to the present invention with a C-axis unit for a machine tool, comprising
- a bushing adapted to be fixed to a unit support of a machine tool at a lower end of the unit support, said bushing extending along a vertical axis when fixed to the unit support of the machine tool,
- a head mounting platform adapted to receive an operating head, said head mounting platform being supported by the bushing and being rotatable relative to the bushing around said vertical axis, and
- a platform rotation motor supported by the bushing and configured to control the rotation of the head mounting platform,
the C-axis unit being characterized by further comprising
- a spindle motor configured to control the rotation of a tool-carrying spindle of the operating head by means of a driving extension arranged in a through-bore obtained through the head mounting platform, wherein the spindle motor is fixed to and is rotationally integral with the head mounting platform.

The spindle motor, no longer being fixed integrally to the structure of the ram, does not obstruct the passage of the electric power and signal cables, thus making assembly easier and prolonging the life of the electric cables, since they no longer have to be arranged in such a way as to undergo bending and torsion during operation.

The electric cables that rotate integral with the head mounting platform no longer wind in a spiral manner, as in the known execution, but may be conveyed in a commercial cable-carrying chain adapted to achieve reliably, without twisting and bending the cables, the rotation of the head mounting platform 30 with a considerable increase in the angular travel to +/−360° and the dynamic performance of the C-axis, such as, for example, an angular speed of 30 rpm and an angular acceleration of 30 rad/sect.

The application of the spindle motor on the head mounting platform is also an important simplification of the location of the hydraulic head tubing and makes available the upper part of the ram, thus making applicable a fluidic rotary joint driven by a dedicated kinematic chain. The separation of the rotary joint from the head mounting platform, thus eliminating the friction of the gaskets, has an important positive effect on the positioning and machining accuracy of the C-axis, as well as on the power available to the operating heads.

The location at the top of the rotary joint allows the replacement of the cable-carrying chain with a possible slip ring that allows endless rotation of the C-axis.

The application of the spindle motor directly fixed to the head mounting platform allows a significant simplification of the assembly of the kinematic chain and an exceptional increase in the dynamic performance of the kinematic chain of the spindle rotation.

In effect, due to the elimination of the long transmission bar, a source of significant torsional failures, a significant increase in torsional rigidity and in the frequencies of the kinematic chain is obtained such as to allow machining with high chip removal, eliminating the onset of chattering, and the increase in rotational speeds of the operating heads.

The advantages of the present invention make it possible to achieve a significant increase in the dynamic performance of the head mounting platform, for example an axis rotation speed of 30 rpm and an angular acceleration of 30 rad/sec' and a significant increase in the dynamic performance of the kinematic chain of spindle rotation of 20%.

BRIEF DESCRIPTION OF THE DRAWINGS

Further features and advantages of the present invention will become apparent from the detailed description that follows, provided purely by way of non-limiting example with reference to the accompanying drawings, wherein:

FIG. 1 shows a C-axis unit for a machine tool according to the prior art, represented in section;

FIG. 3a is an enlarged detail view of the lower part of the main body of the C-axis unit of FIG. 1, showing for example a head coupling system.

DETAILED DESCRIPTION OF THE INVENTION

Figure 4:
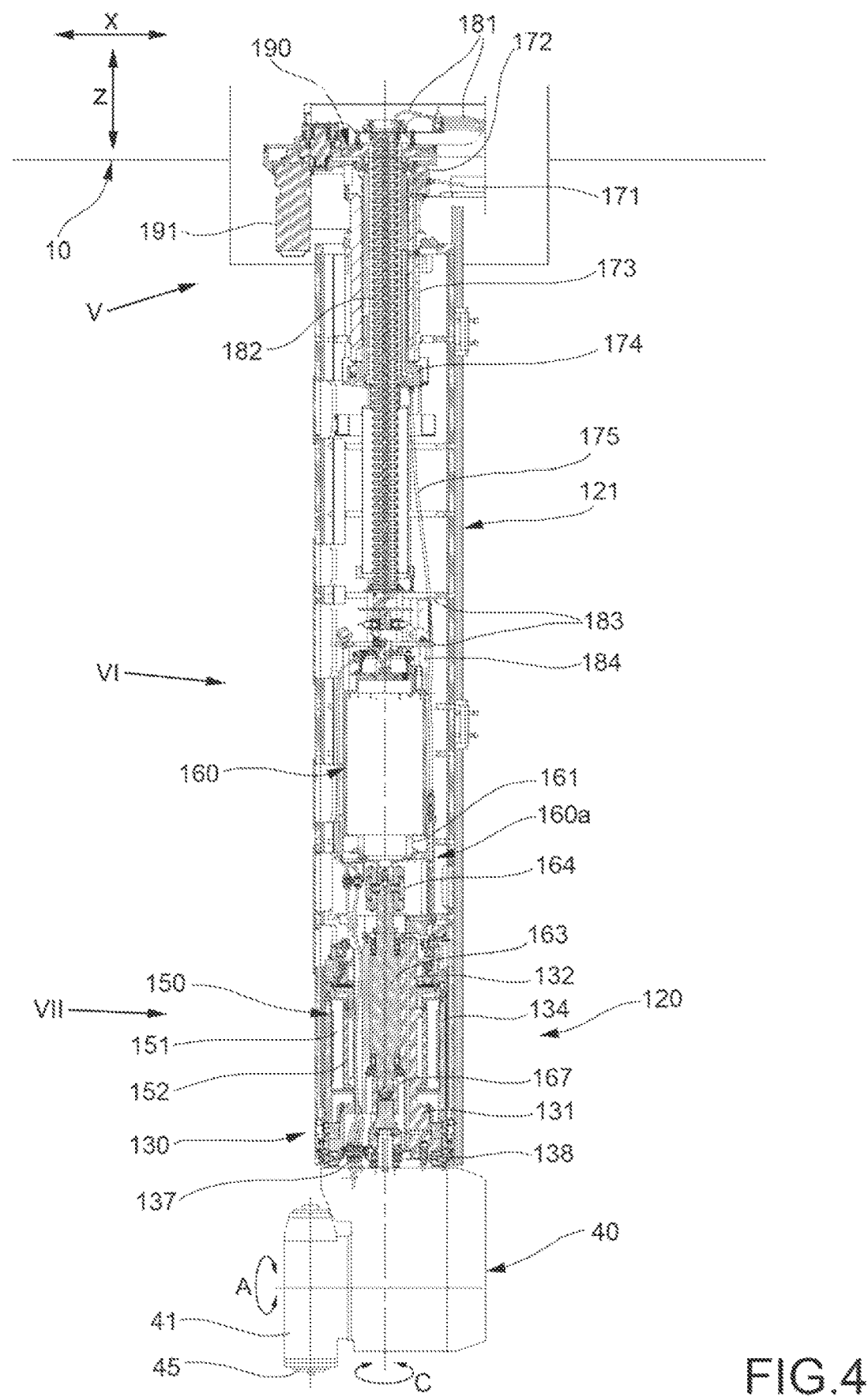
FIG. 4 shows a C-axis unit for a machine tool according to an embodiment of the invention, represented in section.
Figure 5:
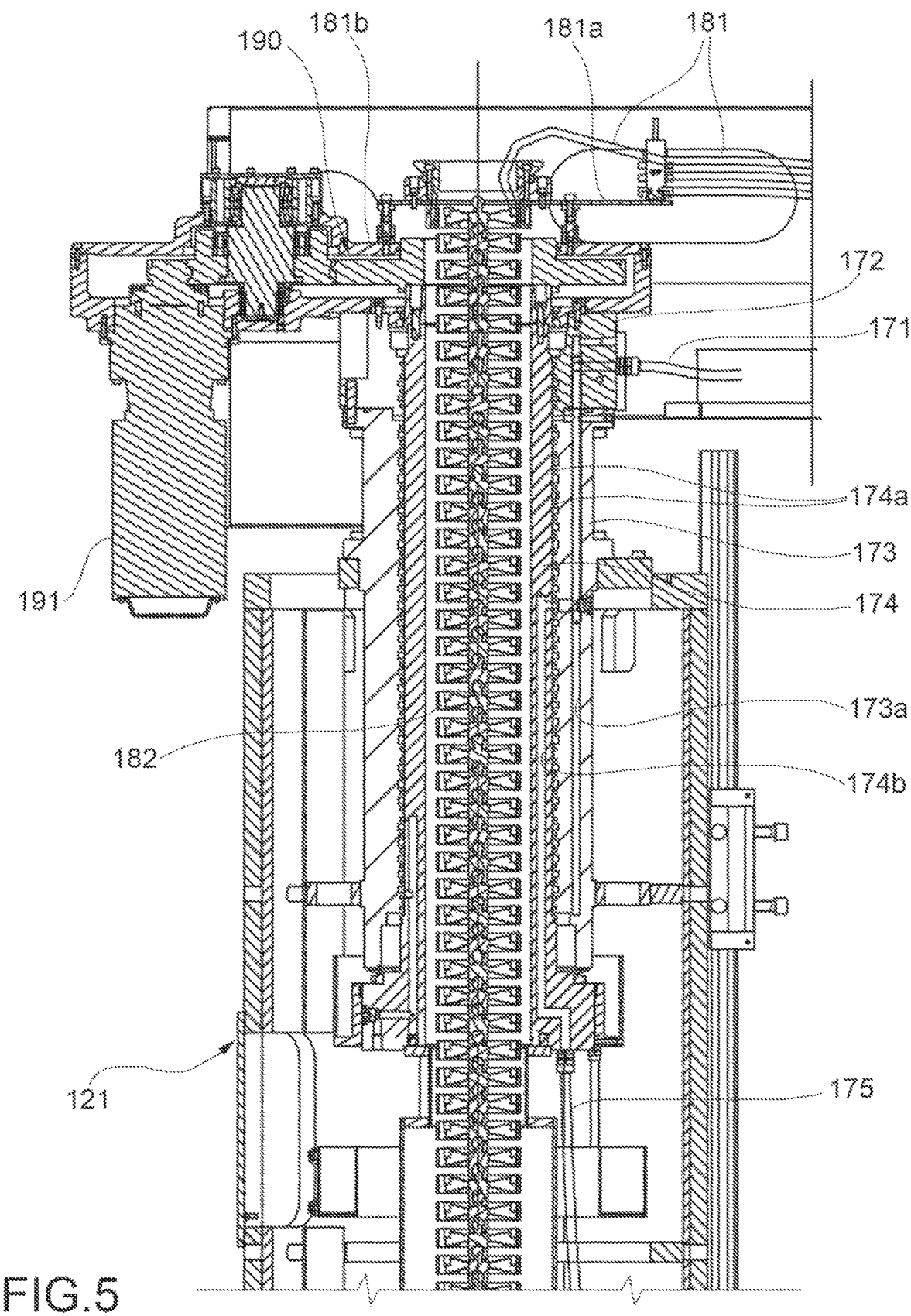
FIGS. 5 to 7 are views on a magnified scale of parts of the C-axis unit in FIG. 4, as indicated at V, VI and VII respectively.
Figure 6:
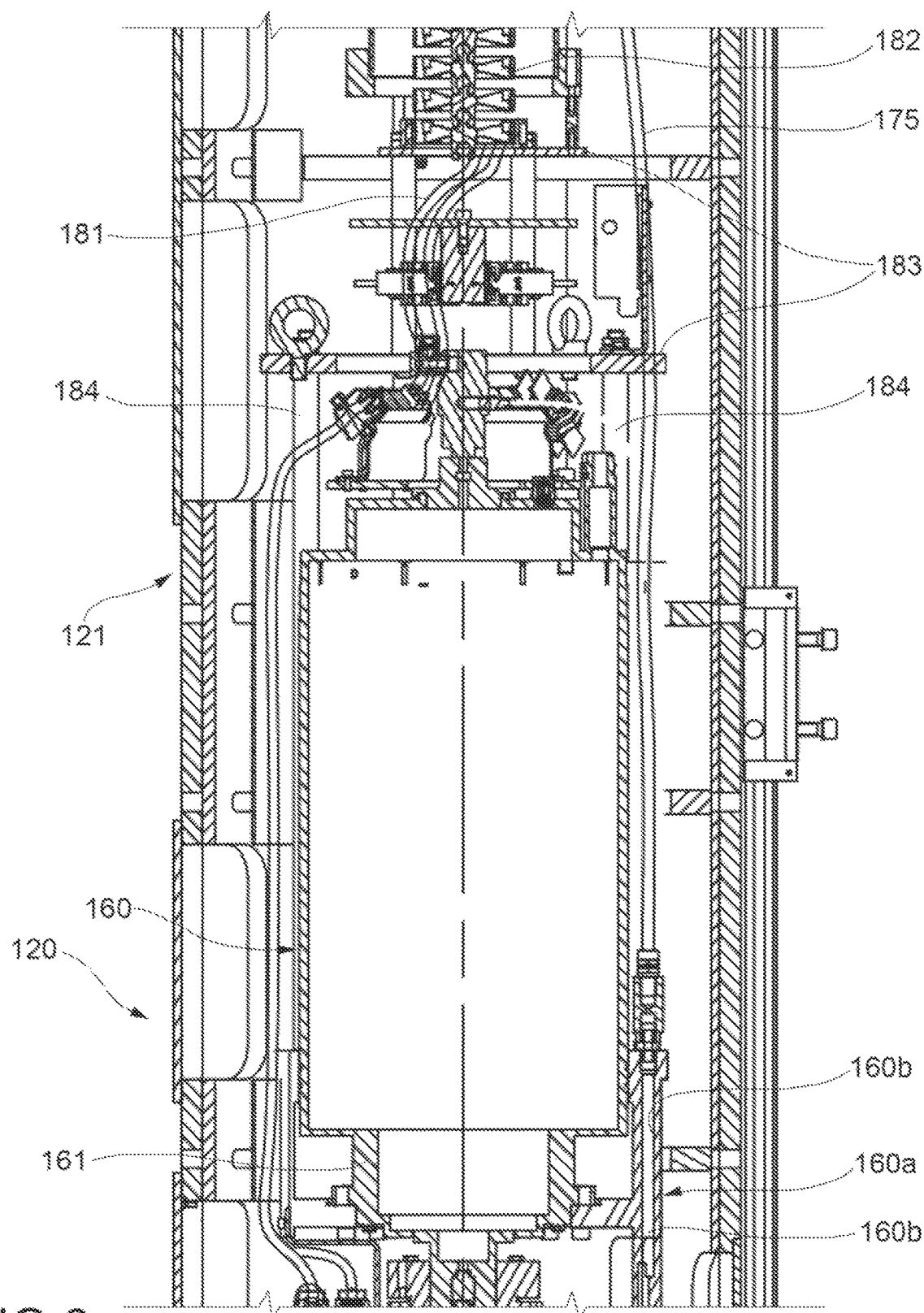
Figure 7:
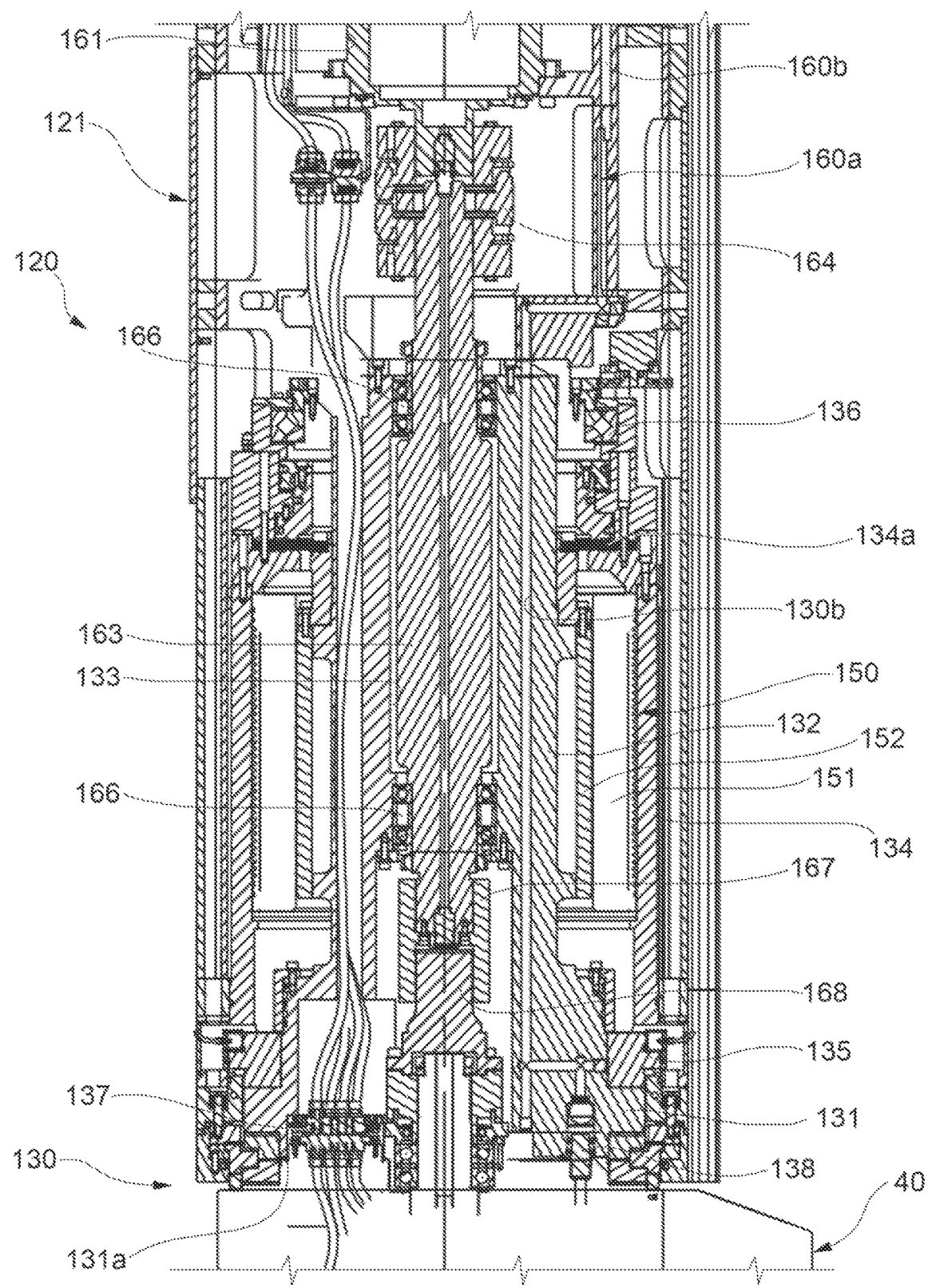
Figure 8:
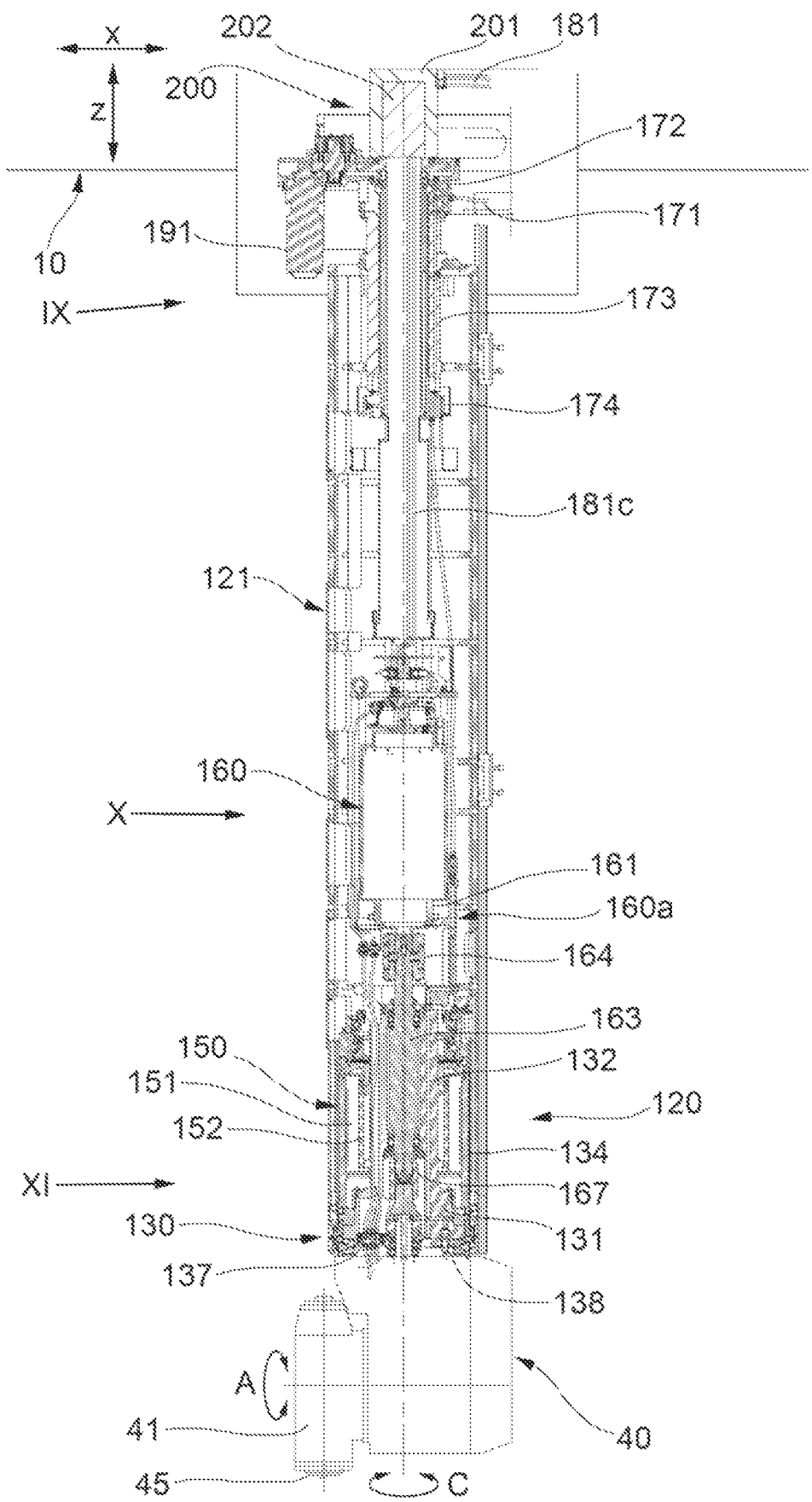
FIG. 8 shows a C-axis unit for a machine tool according to another embodiment of the invention, represented in section.
Figure 9:
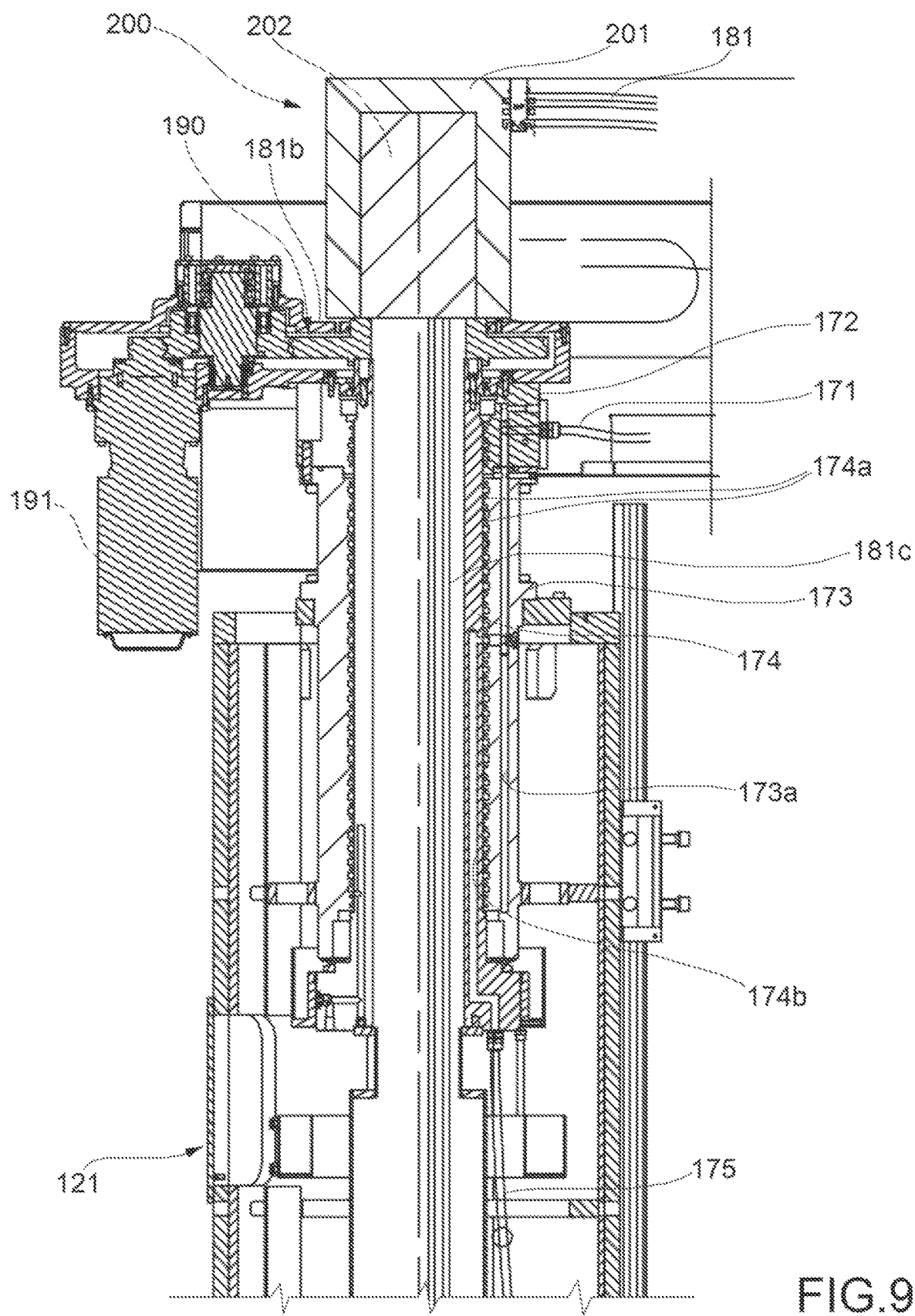
FIGS. 9 to 11 are views on a magnified scale of parts of the C-axis unit in FIG. 8, as indicated at IX, X and XI respectively.
Figure 10:
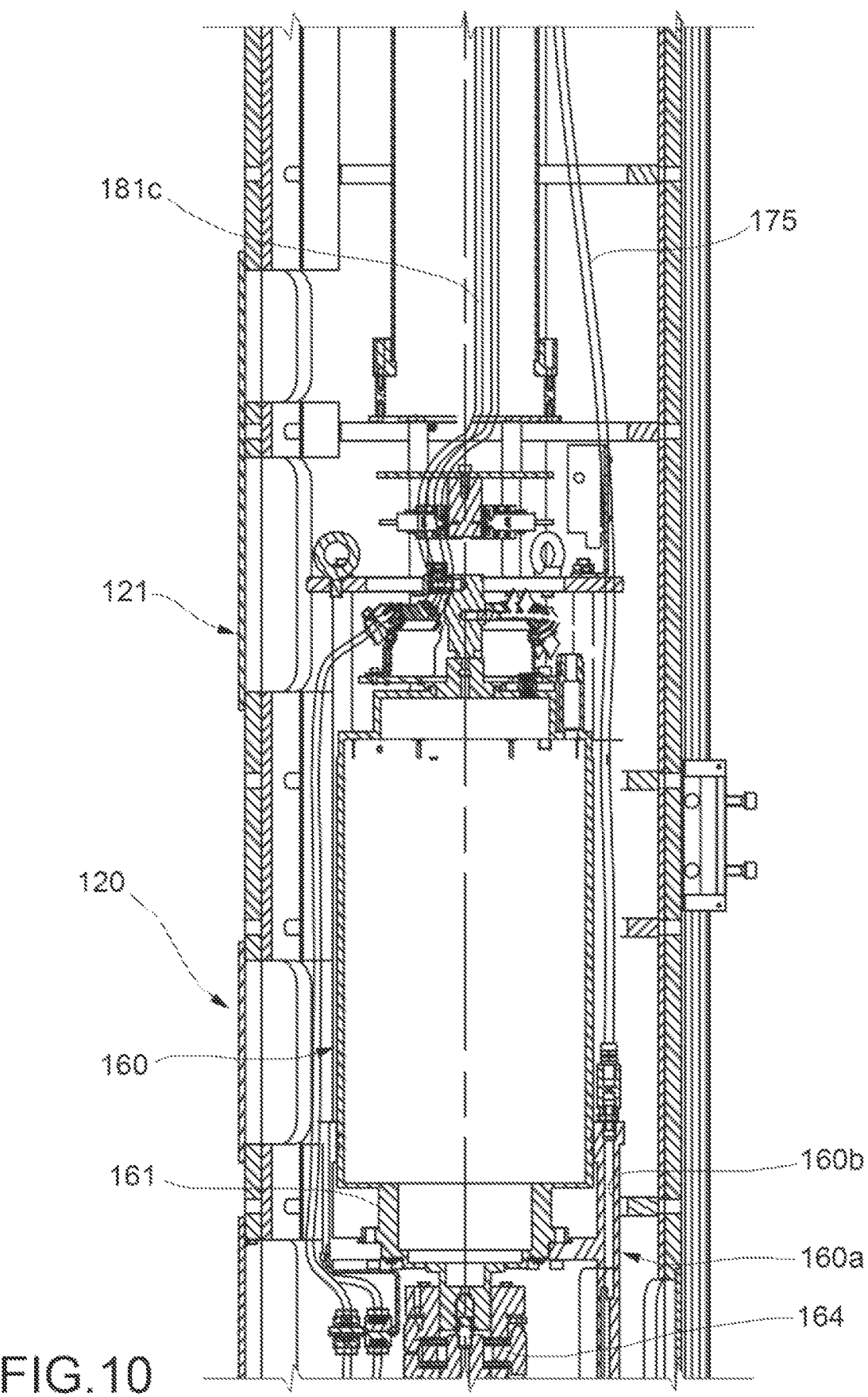
Figure 11:
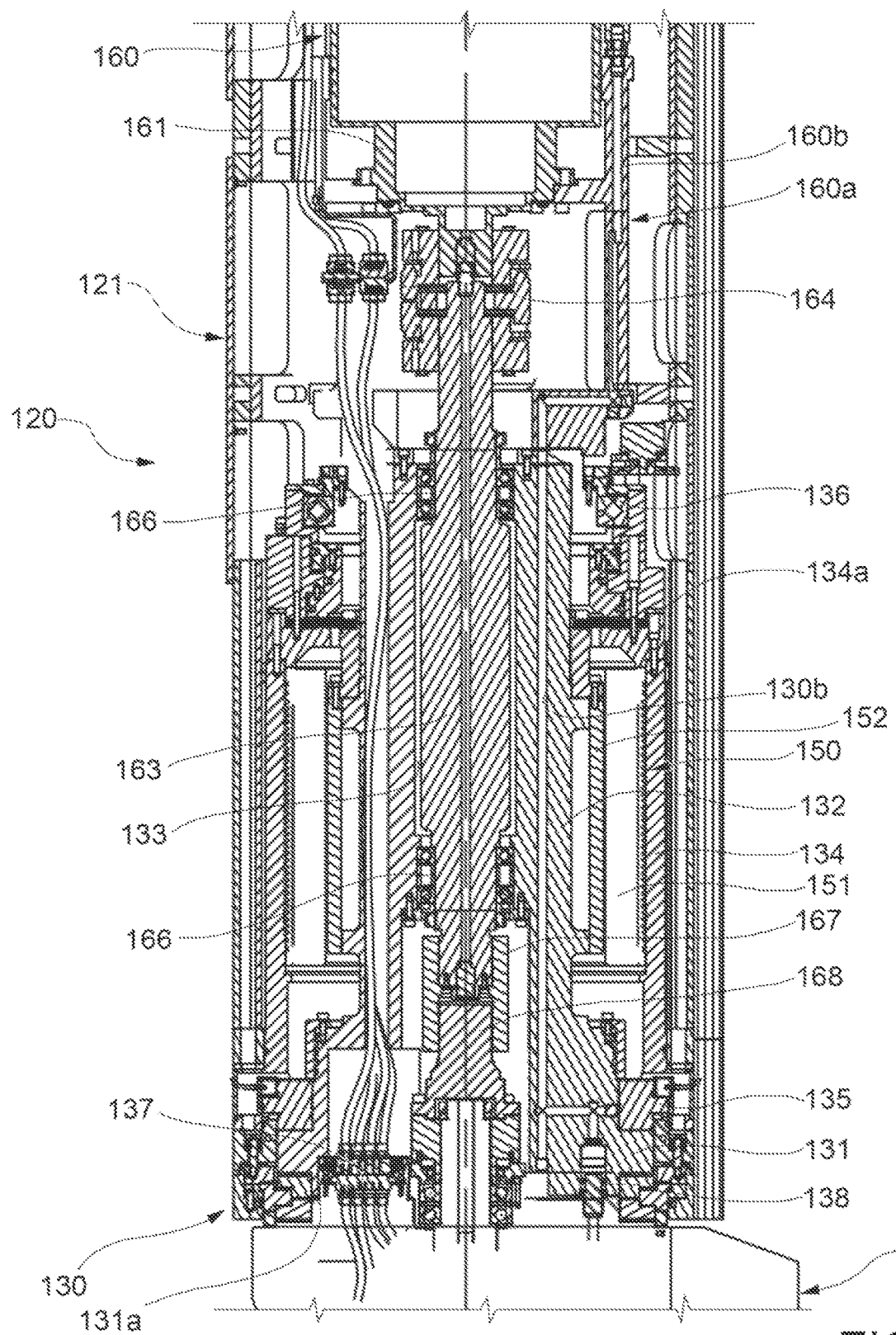

With reference to FIGS. 4 to 7, a machine tool comprising a C-axis unit according to the invention will now be described. Only the part related to the movement according to the polar axis C is represented in FIGS. 4 to 6. Conventionally, two linear axes are indicated at X and Y, whereas the two polar axes of rotation around the horizontal axis X and around the vertical axis Z are designated at A and C respectively. In the figures, the unrepresented axis Y is perpendicular to the drawing plane (the axes X and Y may be reversed). However, it is not essential for the purposes of the invention for the machine tool to have 5 axes of movement.

The machine tool comprises a bearing structure 10, sketched simply in FIG. 4, and a support group 121, supported by the bearing structure 10 and movable in a way known per se with respect to the bearing structure 10 along at least one axis, and in particular along two horizontal orthogonal axes X and Y and along a vertical axis Z.

In the example illustrated, the unit support 121 is formed as a ram that extends along the vertical axis Z and will be indicated as such for simplicity hereinafter. The ram 121 is connected to the bearing structure 10 of the machine tool in a way that is known per se.

A C-axis unit 120 is arranged on board the ram 121, at a lower end thereof.

The C-axis unit comprises a head mounting platform 130 adapted to receive an operating head 40. The head mounting platform 130 is rotatable with respect to the ram 121 around the vertical axis Z, and thus in the direction of the polar axis C. The head mounting platform 130 comprises a main body 131, to which the operating head 40 is intended to be fixed, and a shaft 132 extending coaxially with the axis Z. The shaft 132 is made as a single piece with the main body 131. A central through-bore 133 is obtained through the head mounting platform 130, the object of which will be clarified hereinafter.

The head mounting platform 130 is supported by a bushing 134 fixed to the bottom of the ram 121. In particular, the head mounting platform 130 is supported by the bushing 134 by means of a radial-axial bearing 135 and a roller bearing 136. Between the head mounting platform 130 and the bushing 134, there is further interposed a multi-plate clutch 134a which may be activated when one needs to lock the head mounting platform 130 with respect to the bushing 134/ram 121.

Figure 2:
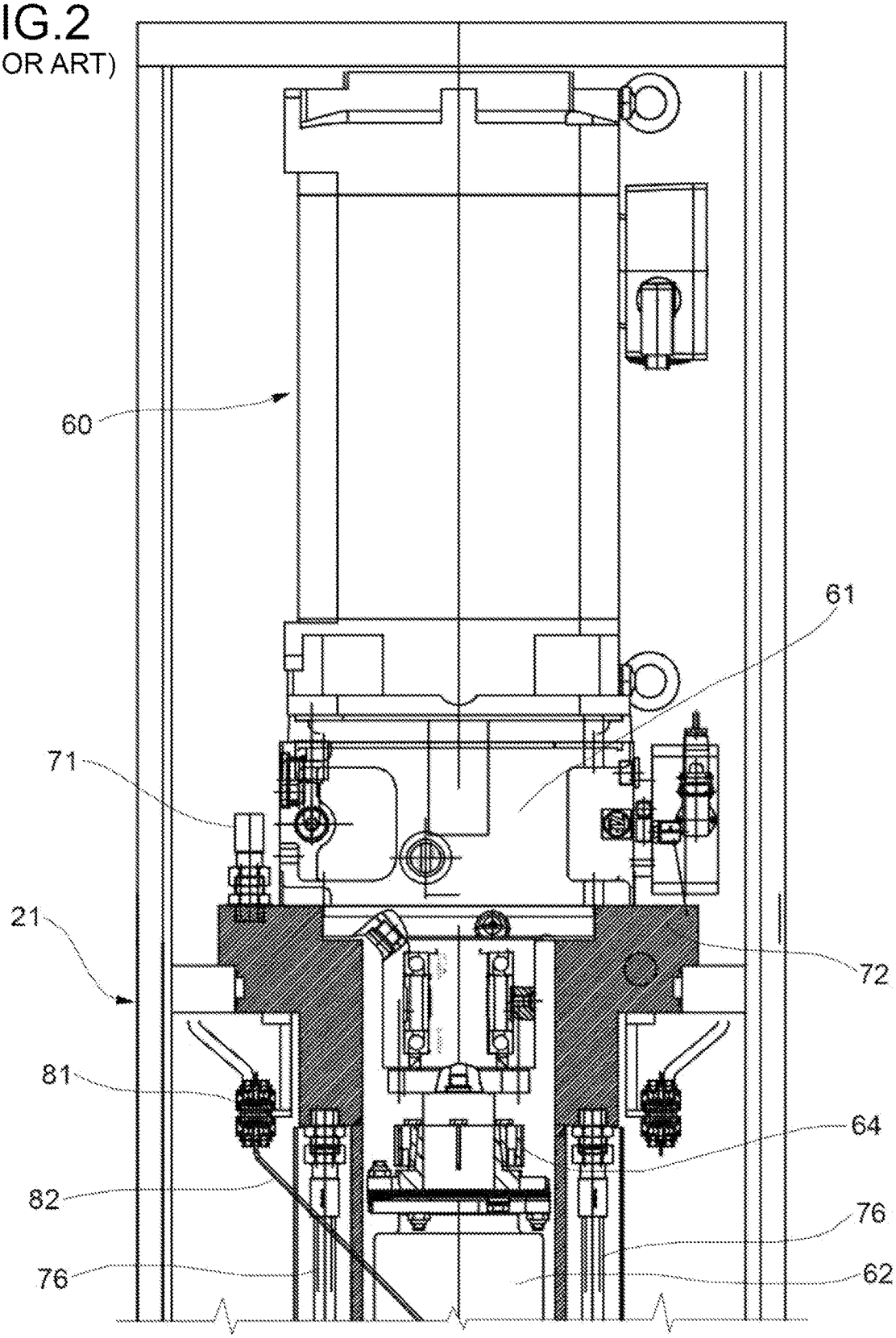
FIGS. 2 and 3 are views on a magnified scale of parts of the C-axis unit in FIG. 1, respectively indicated at II and III in FIG. 1.
Figure 3:
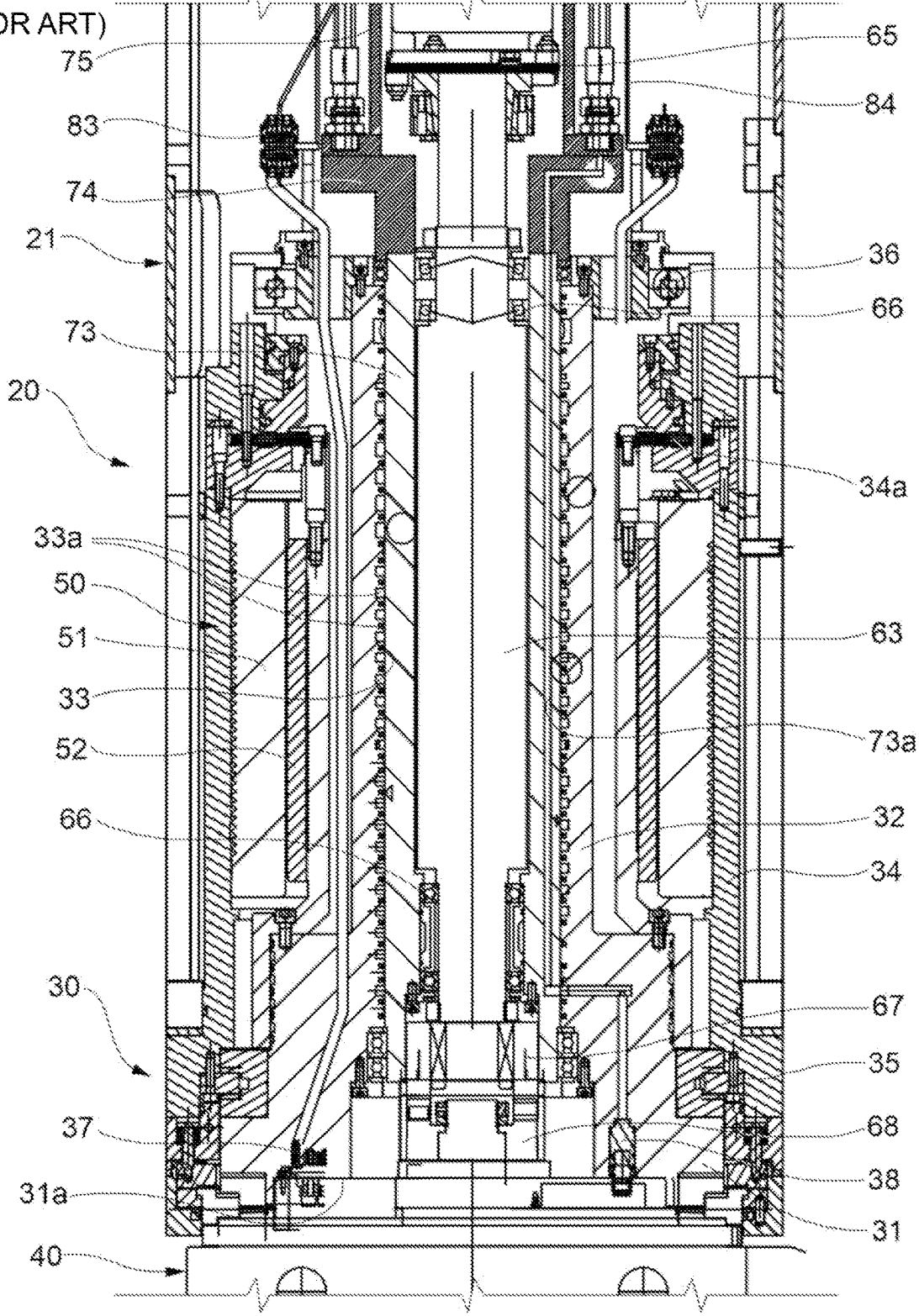

On a lower surface 131a of the main body 131 of the head mounting platform 130 are arranged electrical connectors 137 and hydraulic connectors 138, adapted to supply the electrical power, signal and fluid users on the operating head 40. In the lower part of the main body 131 of the head mounting platform 130 are also arranged head coupling systems that may be manual or automatic, for example similar to those illustrated in FIG. 3a.

The operating head 40 is fixed (manually, semi-automatically or automatically) to the head mounting platform 130 so as to also be rotatable around the vertical axis Z. In the example shown, the operating head 40 is configured in such a way as to have a part 41 rotatable with respect to the operating head 40 around the horizontal axis X, and thus according to the direction of the polar axis A. On board the part 41 of the operating head 40 a tool-carrying spindle 45 is arranged, which is intended for the attachment of a tool (not shown). The head 40 described above may be removed and replaced with heads having different architectures.

The configuration of the operating head 40 is not essential for the purposes of the invention.

Underneath the operating head 40 there is arranged a workpiece-carrying unit to support a workpiece.

The C-axis unit further comprises a platform rotation motor 150 configured to control the rotation of the head mounting platform 130. The platform rotation motor 150 may, for example, consist of a torque motor, a worm gear/helical gear motor, or preloaded electrical double motors. The platform rotation motor 150 comprises a radially outer stator part 151 fixed to the bushing 134, and a radially inner rotor part 152 fixed to the shaft 132 of the head mounting platform 130.

The C-axis unit further comprises a spindle motor 160, fixed to the head mounting platform 130 by means of a motor support consisting of two parts fixed to each other and shown in the figures at 161 and 160a. The spindle motor 160 is thus connected to the shaft 132 of the mounting platform 130 and is thus rotationally integral with the head mounting platform 130.

A gearbox, for example a planetary gearbox, may be associated with the spindle motor 160.

The spindle motor 160 is configured to control the rotation of the tool-carrying spindle 45 on the operating head 40. For this purpose, a driving extension 163 is provided to transmit power to the head mounting platform 130. An upper end of the driving extension 163 is connected to the output shaft of the spindle motor 160 by an upper transmission coupling 164, whereas a lower end of the driving extension 163 is inserted into the central bore 133 of the head mounting platform 130 and connected to the head mounting platform 130 by means of bearings 166.

The driving extension 163 may be connected to a kinematic chain inside the operating head 40 and to the spindle 45 by means of a keyway connection or a grooved shaft 167-168. The coupling is constructed in two parts, so as to ensure the separation of the operating head 40 from the head mounting platform 130. The female part of the coupling 167 is attached to the driving extension 163, whereas the male part of the coupling 168 is mounted on the input shaft of the operating head 40.

The fluid users on the operating head 40 are supplied through tubing 171 that connects a dedicated hydraulic control unit of the machine tool (not shown) to a hydraulic distributor 172. The hydraulic distributor 172 is mounted on the stationary part 173 of a hydraulic rotary joint, which is in turn fixed to a septum (horizontal rib) of the ram 121.

The fluidic rotary joint comprises a rotary part 174 inserted into a bore in the stationary part 173. Between the stationary part 173 and the rotary part 174 of the rotary joint, there is interposed a series of gaskets 174a placed along the bore that houses the rotary part 174.

The rotary part 174 of the rotary joint is fluidically supplied through fluid supply bores 173a made in the stationary part 173 of the rotary joint and the gaskets 174a. Through fluid supply bores 174b made in the rotary part 174 of the rotary joint and connected to tubing 175 connected on one side to the rotary part 174 of the rotary joint and on the other to the motor support 160a, the motor support 160a is fluidically supplied. Through fluid supply bores 160b made in the motor support 160a, connected to corresponding supply bores 130b made in the head mounting platform 130, the head mounting platform 130 and hydraulic connectors 138 are supplied.

The power and signal users on the operating head 40 are supplied by power and signal cables 181 that connect electrical and numerical control cabinets of the machine tool (not shown) to the C-axis unit. The cables 181 are anchored to a plate 181a which in turn is fixed to an input support 181b. The input support 181b is attached to the distributor 172 and to the stationary part 173 of the rotary joint. The top end of a cable-carrying chain 182 is fixed to the plate 181a and is arranged inside a central through-bore in the rotary part 174 of the rotary joint. The cables 181 from the plate 181a are therefore routed inside the cable-carrying chain 182. A lower end of the cable-carrying chain 182 is fixed to a support 183 which, by means of columns 184, is fixed to the motor support 160a rotating with the head mounting platform 130. The cables 181 are thus in part electrically connected to the spindle motor 160 and in part to the electrical connectors 137 arranged on the bottom surface 131a of the head mounting platform 130. Naturally, there are also electric power and signal cables connected to fixed users, for example to the stator of the rotation platform motor, but these cables are not shown because, not connecting parts that may be rotated with respect to each other, they are not of interest for the purposes of the present invention.

To eliminate the torque disturbances to the platform rotation motor 150 due to the friction of the gaskets 174a, the hydraulic rotary joint 173-174 is controlled rotationally by a dedicated kinematic chain 190 and motor 191. The synchronization of the rotation of the hydraulic rotary joint 173-174 with the rotation of the platform rotation motor 150 is achieved by two measuring systems, integrated in the motors 150 and 191 and the control algorithms of the numerical control (CNC).

The C-axis unit in the configuration described above is able to complete a rotation of +/−360° according to the C-axis, with a limited torsion of the cables 181 that are arranged at the rotation axis of the head mounting platform 30, in the cable-carrying chain 182.

With reference to FIGS. 8 to 11, a machine tool comprising a C-axis unit according to a second embodiment of the invention will now be described. Elements corresponding to those of the preceding embodiments have been designated with the same numerical references and will not be further described. The embodiment of FIGS. 8 to 11 differs from the preceding one essentially in that it provides a slip ring in place of the cable-carrying chain. This device allows for endless rotation of the C-axis unit to be achieved.

The slip ring, indicated at 200 in FIGS. 8-11, comprises a stationary part 201 mounted on the input support 181b and a rotary part 202 made integral with the rotary part 174 of the fluidic rotary joint. The electric power and signal cables 181 connecting the electrical and numerical control cabinets of the machine tool to the C-axis unit 120 are electrically connected to the stationary part 201 of the slip ring. Electric current and signals are transmitted in a manner known per se from the stationary part 201 to the rotary part 202 of the slip ring. Additional electric cables 181c are connected to the rotary part 202 of the slip ring and are distributed among the various users. The cables 181c are thus in part electrically connected to the spindle motor 160 and in part to the electrical connectors 137 arranged on the bottom surface 131a of the head mounting platform 130. In the part immediately below the slip ring, the cables 181c are run through a central through-bore obtained through the rotary part 174 of the hydraulic rotary joint.

Naturally, without altering the principle of the invention, the embodiments and the details of construction may vary widely with respect to those described and illustrated purely by way of non-limiting example, without thereby departing from the scope of the invention as defined in the accompanying claims.

What is claimed:

1. A C-axis unit for a machine tool, comprising
a bushing fixed to a ram of the machine tool at a lower end of the ram, said bushing extending along a vertical axis of the ram;
a head mounting platform adapted to receive an operating head, said head mounting platform being supported by the bushing and being rotatable relative to the bushing around said vertical axis, said operating head comprising a tool-carrying spindle rotatable relative to the operating head;
a platform rotation motor supported by the bushing and configured to control rotation of the head mounting platform for chip removal machining; and
a spindle motor configured to control rotation of the tool-carrying spindle relative to the operating head for chip removal machining; and a driving extension connected to an output shaft of the spindle motor, arranged in a through-bore of the head mounting platform, and connected to the tool-carrying spindle, wherein the spindle motor is rotationally fixed to the head mounting platform, wherein the spindle motor is within, and rotatable relative to, the ram with the driving extension residing solely within the ram.

2. A machine tool comprising
a ram translationally movable along at least one axis, at a lower end of which there being mounted a C-axis unit, the C-axis unit comprising
a bushing fixed to the ram at a lower end of the ram, said bushing extending along a vertical axis;
a head mounting platform adapted to receive an operating head, said head mounting platform being supported by the bushing and being rotatable relative to the bushing around said vertical axis, said operating head comprising a tool-carrying spindle rotatable relative to the operating head;
a platform rotation motor supported by the bushing and configured to control rotation of the head mounting platform for chip removal machining; and
a spindle motor configured to control rotation of the tool-carrying spindle relative to the operating head for chip removal machining; and a driving extension connected to an output shaft of the spindle motor, arranged in a through-bore of the head mounting platform, and connected to the tool-carrying spindle; wherein the spindle motor is rotationally fixed to the head mounting platform, wherein the spindle motor is within, and rotatable relative to, the ram with the driving extension residing solely within the ram; and
a fluidic rotary joint for supplying at least one fluid to the operating head, said fluidic rotary joint being arranged at an upper end of the ram and comprising a stationary part fixed to the ram and a rotary part rotatable relative to the bushing around said vertical axis.

3. The machine tool according to claim 2, wherein the rotary part of the fluidic rotary joint is controllable in rotation by means of a joint motor arranged on the ram and separate from the platform rotation motor,
the joint motor and the platform rotation motor being controllable to synchronize an angular position and rotation speed of the rotary part with an angular position and rotation speed of the head mounting platform.

4. The machine tool according to claim 2, further comprising a plurality of electric power and signal cables for power supply and control of at least one of said spindle motor and operating head,
said electric cables being conveyed from outside of the ram through a cable-carrying member arranged above the spindle motor, said cable-carrying member having an upper end fixed to the ram and a lower end rotationally fixed to the rotary part of the fluidic rotary joint.

5. The machine tool according to claim 2, further comprising a plurality of electric power and signal cables for power supply and control of at least one of said spindle motor and operating head, and
a slip ring arranged at an upper end of the ram, said slip ring including a stationary part fixed to the ram and a rotary part rotationally fixed to the rotary part of the fluidic rotary joint, said rotary part of the slip ring being electrically connected to at least one of said spindle motor and said operating head.

* * * * *